(12) United States Patent
Kojima et al.

(10) Patent No.: US 7,538,526 B2
(45) Date of Patent: May 26, 2009

(54) SWITCHING REGULATOR, AND A CIRCUIT AND METHOD FOR CONTROLLING THE SWITCHING REGULATOR

(75) Inventors: Shinichi Kojima, Osaka (JP); Hisashi Kai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 373 days.

(21) Appl. No.: 11/603,529

(22) Filed: Nov. 21, 2006

(65) Prior Publication Data

US 2007/0120548 A1 May 31, 2007

(30) Foreign Application Priority Data

Nov. 22, 2005 (JP) ............................. 2005-337225

(51) Int. Cl.
*G05F 1/613* (2006.01)
*G05F 1/40* (2006.01)
(52) U.S. Cl. .................. 323/225; 323/284; 323/271
(58) Field of Classification Search ................. 323/222, 323/225, 271, 282, 284, 285, 290, 351
See application file for complete search history.

(56) References Cited

U.S. PATENT DOCUMENTS

| | | | |
|---|---|---|---|
| 5,481,178 A | | 1/1996 | Wilcox et al. |
| 5,861,735 A | * | 1/1999 | Uchida ........................ 323/271 |
| 6,541,947 B1 | * | 4/2003 | Dittmer et al. ............... 323/284 |
| 6,628,489 B1 | * | 9/2003 | Pardoen et al. ................ 361/84 |
| 6,987,333 B2 | * | 1/2006 | Winick et al. ................. 307/85 |
| 2007/0029979 A1 | * | 2/2007 | Williams et al. ............. 323/217 |

FOREIGN PATENT DOCUMENTS

| | | |
|---|---|---|
| JP | 3614156 | 11/2004 |
| JP | 2005-168173 | 6/2005 |

* cited by examiner

*Primary Examiner*—Jessica Han
(74) *Attorney, Agent, or Firm*—Cooper & Dunham, LLP

(57) ABSTRACT

A switching regulator includes a first switching element for charging an inductor, a switching circuit for discharging the inductor, a controller circuit for generating a first control signal for controlling the level of an output voltage of the switching regulator, and a reverse current suppressing circuit for controlling the on-resistance of the switching circuit based on whether a reverse current is detected in the switching regulator. A circuit and method for controlling the switching regulator are also disclosed.

20 Claims, 13 Drawing Sheets

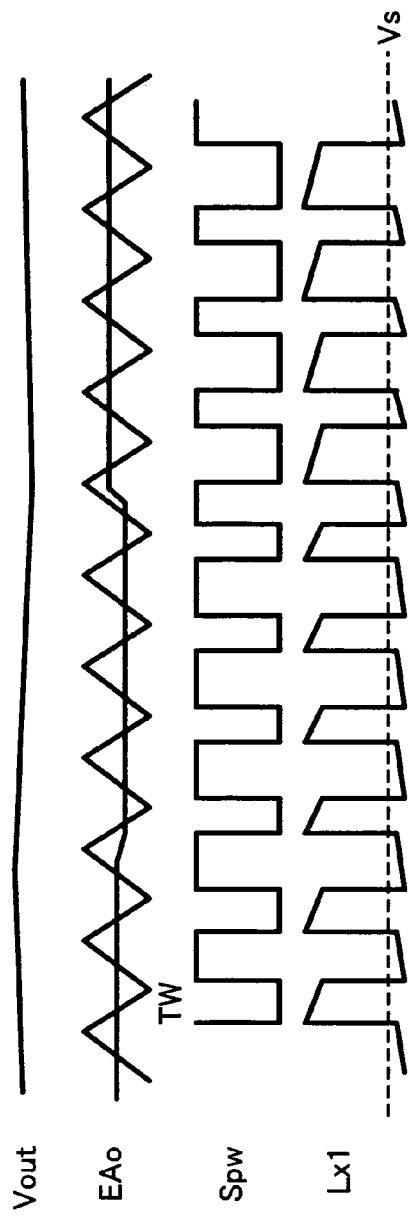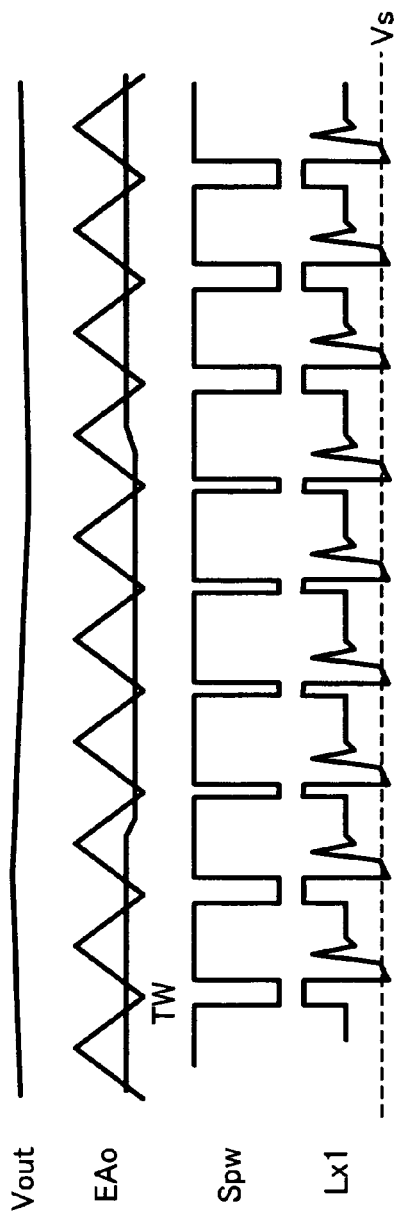

SWITCHING REGULATOR, AND A CIRCUIT AND METHOD FOR CONTROLLING THE SWITCHING REGULATOR

TECHNICAL FIELD

This disclosure relates generally to a switching regulator, and more particularly to a circuit and method for controlling the switching regulator.

DESCRIPTION OF THE RELATED ART

As illustrated in FIG. 1, a background synchronous switching regulator includes an input terminal 101, an output terminal 104, an inductor L, a capacitor C, a phase wave modulation (PWM) controller 130 including a detector 131, an output driver 132, and a PWM circuit 133, a P-channel metal oxide semiconductor (PMOS) transistor QP1, an N-channel metal oxide semiconductor (NMOS) transistor QN1, and an error amplifier 140. In order to maintain high efficiency at light-loads, the NMOS transistor QN1 is disabled. For example, the detector 131 monitors the voltage at the node K between the PMOS transistor QP1 and the NMOS transistor QN1. When the voltage at the node K starts increasing after its value reaches below the ground voltage, the NMOS transistor QN1 is disabled. This technique is disclosed, for example, in the Japanese Patent Application Publication No. 2004-56982, published on Feb. 19, 2004.

However, when the NMOS transistor QN1 is disabled, a damping noise N may be generated as illustrated in FIG. 2. Similarly, a damping noise N may be generated when a step-up switching regulator, which is similar to the step-down switching regulator of FIG. 1, is used as illustrated in FIG. 3. One of the factors causing the damping noise N is related to the recovery characteristics of the diode of the NMOS transistor QN1. Since the current flowing through the inductor L cannot be changed instantly, the voltage at the node K continues to increase even after the NMOS transistor QN1 is disabled, thus generating oscillations, i.e., the damping noise N as illustrated in FIG. 2 or 3 from the loop including the inductor L and the capacitor C.

Further, with the increased demand for smaller-sized device, the inductance of the inductor L is getting smaller into the range of 10 μH or less. Accordingly, the peak value of the reverse current tends to increase especially when the output voltage is high.

BRIEF SUMMARY

Exemplary embodiments of the present disclosure include various types of switching regulator, each of which converts an input voltage input through an input terminal to an output voltage output through an output terminal.

In one example, the switching regulator includes a controller circuit, a first switching element, a switching circuit, and a reverse current suppressing circuit. The controller circuit detects a current or a voltage in the switching regulator and outputs a first control signal for controlling a level of the output voltage based on the detected voltage or current. The first switching element alternately turns on and off according to the first control signal to charge an inductor. The switching circuit includes a second switching element, which turns on and off according to the first control signal in a reciprocal manner with the first switching element to discharge the inductor. The first switching element and the switching circuit are connected at a switch node. The reverse current suppressing circuit generates a second control signal indicating whether a reverse current flowing from the output terminal toward the switching circuit is generated or is about to be generated, and adjusts on-resistance of the switching circuit based on the second control signal. In order to adjust the on-resistance of the switching circuit, the on-resistance value of the second switching element may be changed, for example, by controlling the gate voltage of the second switching element. Alternatively, the switching circuit may be provided with a third switching element, which is disabled when the second control signal indicates that the reverse current is generated or is about to be generated.

In addition to the above, the present disclosure may be implemented in various other ways, for example, as a circuit or method for controlling the switching regulator.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 5 is a timing chart for explaining operation performed by the switching regulator shown in FIG. 4;

FIG. 6 is a timing chart for explaining operation performed by the switching regulator shown in FIG. 4;

DETAILED DESCRIPTION OF EXEMPLARY EMBODIMENTS

Figure 1:
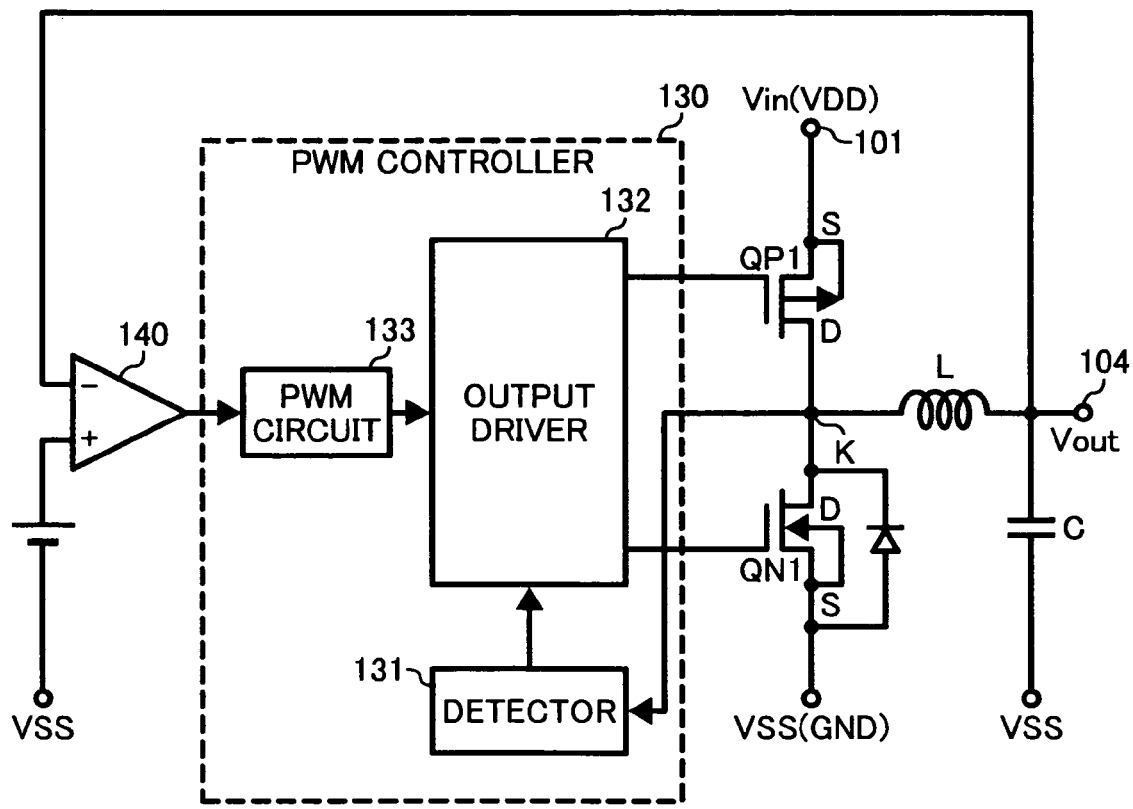
FIG. 1 is a schematic circuit diagram illustrating the structure of a background switching regulator.
Figure 2:
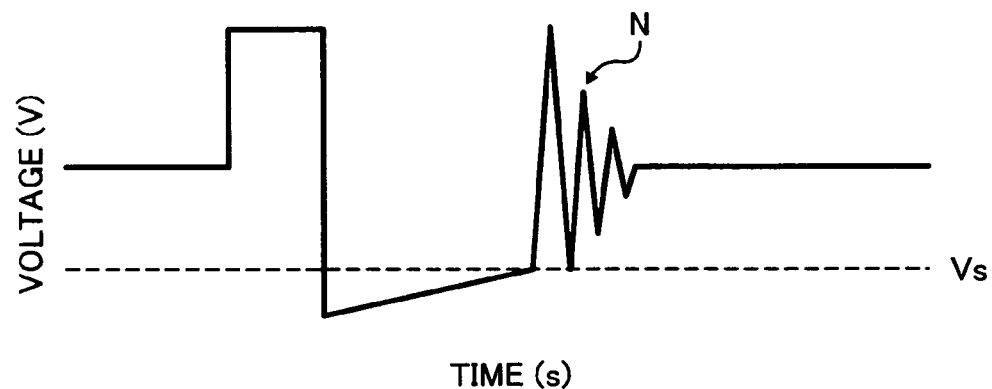
FIG. 2 is a waveform chart illustrating a damping noise generated in the background switching regulator shown in FIG. 1.
Figure 3:
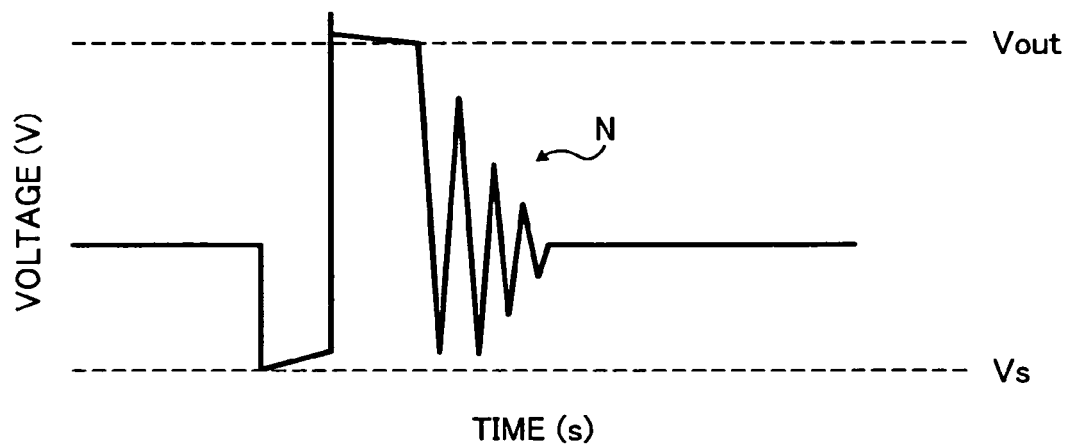
FIG. 3 is a waveform chart illustrating a damping noise generated in a background switching regulator.

In describing the exemplary embodiments illustrated in the drawings, specific terminology is employed for clarity. However, the disclosure of this patent specification is not intended to be limited to the specific terminology selected and it is to be understood that each specific element includes all technical equivalents that operate in a similar manner. Referring now to the drawings, wherein like reference numerals designate identical or corresponding parts throughout the several views, exemplary embodiments of a switching regulator are explained with reference to FIGS. 4 to 15. Any one of the switching regulators described below is a synchronous switching voltage regulator having a pair of switching elements that are turned on and off out of phase with one another. By controlling the operation of the pair of switching elements, the level of an output voltage Vout, which is output to a load 10 coupled to the circuit, is adjusted around a reference level.

Figure 4:
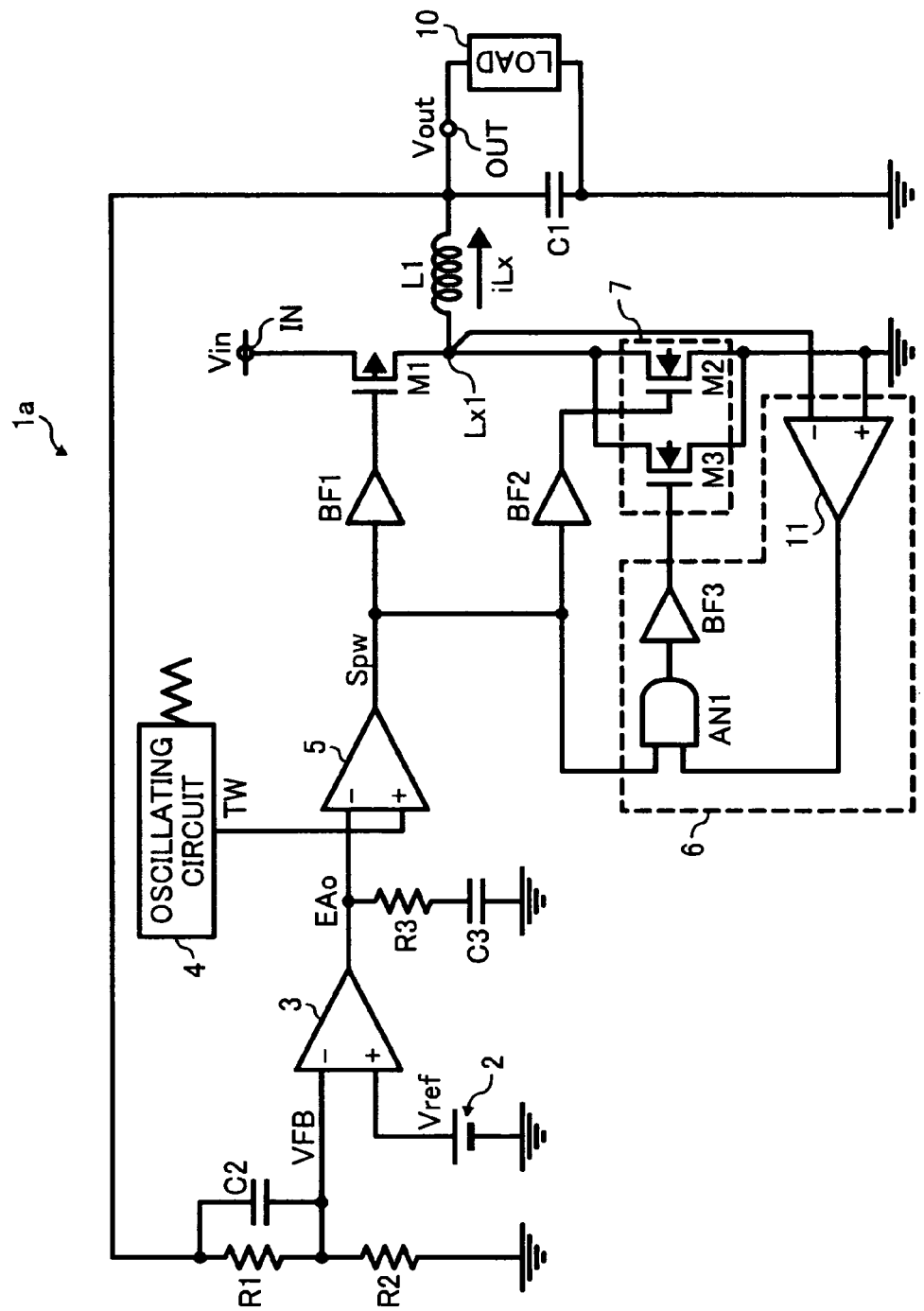
FIG. 4 is a schematic circuit diagram illustrating the structure of a switching regulator according to an exemplary embodiment of the present disclosure.

Referring now to FIG. 4, the circuit structure and operation of a switching regulator 1a are explained. The switching regulator 1a is a step-down voltage-mode controlled switching regulator, which converts the input voltage Vin to the output voltage Vout that is smaller than the input voltage Vin using the feedback from the detected voltage.

The switching regulator 1a includes an input terminal IN, an output terminal OUT, a first capacitor C1, an inductor L1, a first switching element M1, a switching circuit 7 including a second switching element N2 and a third switching element M3, a reverse current suppressing circuit 6, and a controller circuit including a reference voltage generator 2, a first resistor R1, a second resistor R2, a third resistor R3, an error amplifier circuit 3, an oscillating circuit 4, a phase-width modulation (PWM) comparator 5, a first buffer BF1, a second buffer BF2, a second capacitor C2, and a third capacitor C3. The reverse current suppressing circuit 6 includes an AND circuit AN1, a third buffer B3, and a comparator 11.

In this example, the first switching element M1 is implemented by a P-channel metal oxide semiconductor (PMOS) transistor. The second switching element M2 and the third switching element M3 are each implemented by an N-channel metal oxide semiconductor (NMOS) transistors. The first switching element M1 alternately turns on and off to charge the inductor L1 and the first capacitor C1. The second switching element M2 and the third switching element M3 both operate in a reciprocal manner with the first switching element M1 to circulate the current stored in the inductor L1 to the load 10 to generate the output voltage Vout. Further, in this example, the on-resistance value of the second switching element M2 is set higher than the on-resistance value of the third switching element M3.

Any number of components in the switching regulator 1a may be integrated as one integrated circuit. In one example, the controller circuit and the reverse current suppressing circuit 6 may be formed as one integrated circuit for controlling the switching regulator 1a. In another example, the controller circuit, the reverse current suppressing circuit 6, the first switching element M1, and the switching circuit 7 may be formed as one integrated circuit for controlling the switching regulator 1a.

Still referring to FIG. 4, the first switching element M1 and the second switching element M2 are connected in series at a node Lx1 between the input terminal IN and the ground. The inductor L1 is provided between the node Lx1 and the output terminal Vout. The first resistor R1, the second resistor R2, and the first capacitor C1 are provided in series between the output terminal OUT and the ground. The first resistor R1 is connected in parallel with the second capacitor C2. The error amplifier 3 is connected to the node between the first resistor R1 and the second resistor R2 at the inverse input terminal, and to the reference voltage generator 2 at the non-inverse input terminal. The other end of the reference voltage generating circuit 2 is connected to the ground. The output terminal of the error amplifier 3 is connected to the inverse input terminal of the PWM comparator 5. The third resistor R3 and the third capacitor C3 are provided in series between the output terminal of the error amplifier 3 and the ground. The oscillating circuit 4 is connected to the non-inverse input terminal of the PWM comparator 5. The output terminal of the PWM comparator 5 is connected to the first buffer BF1, the second buffer BF2, and one input terminal of the AND circuit AN1. The other input terminal of the AND circuit AN1 is connected to the output terminal of the comparator 11. The comparator 11 is connected to the node Lx1 at the inverse input terminal and to the ground at the non-inverse input terminal. The output terminal of the AND circuit AN1 is connected to the third buffer BF3, which is connected to the gate of the third switching element M3. The third switching element M3 is provided in parallel with the second switching element M2.

In operation, the controller circuit controls the level of the output voltage Vout based on the detected output voltage Vout, by controlling the ON time of the first switching element M1 or the switching circuit 7. The first resistor R1 and the second resistor R2 divide the output voltage Vout into a feedback voltage VFB, and outputs the feedback voltage VFB to the error amplifier 3. The error amplifier 3 generates an error signal EAo based on the difference between the feedback voltage VFB and a reference voltage Vref generated by the reference voltage generator 2. The error signal EAo is output to the PWM comparator 5. The oscillating circuit 4 outputs a triangular wave signal TW to the PWM comparator 5. The PWM comparator 5 generates a pulse signal Spw based on the difference between the error signal EAo and the pulse signal Spw. The pulse signal Spw is output to the gate of the first switching element M1 via the first buffer BF1 to control the ON time of the first switching element M1. The pulse signal Spw is output to the gate of the second switching element M2 via the second buffer BF2 to control the ON time of the second switching element M2. The pulse signal Spw is output to the gate of the third switching element M3 via the AND circuit AD1 to control the ON time of the third switching element M3. In this example, the third switching element M3 may be disabled by the reverse current suppressing circuit 6 to suppress the flow of the reverse current.

In this example, the reverse current suppressing circuit 6 determines that the current is reversed or is about to be reversed, when the voltage detected at the node Lx1 is equal to or greater than the ground voltage Vs. At this time, the comparator 11 outputs a low level signal to the AND circuit AN1. As a result, the AND circuit AN1 outputs the low level signal to the third buffer BF3, and the third switching element M3 is disabled. Since the on-resistance value of the second switching element M2 is greater than the on-resistance value of the third switching element M3, the on-resistance of the switching circuit 7 increases. Accordingly, the reversed current flowing from the output terminal OUT toward the switching circuit 7 is suppressed.

Referring to FIGS. 5 and 6, an example operation of controlling the level of the output voltage Vout while suppressing the reverse current is explained.

Referring to FIG. 5, when the comparator 11 of the reverse current suppressing circuit 6 determines that no reverse current is generated, i.e., when the voltage detected at the node Lx1 is less than the ground voltage Vs, the comparator 11 outputs a high level signal to the AND circuit AN1. As a result, the AND circuit AN1 outputs the pulse signal Spw to the third buffer BF3. The third switching element M3 is not disabled, and continues to control the level of the output voltage Vout together with the first and second switching elements M1 and M2. In one example, when the output voltage Vout increases as shown in FIG. 5, the voltage of the error signal EAo decreases. Accordingly, the duty cycle of the pulse signal Spw decreases. This further decreases the ON time of the first switching element M1, and increases the ON time of the second and third switching elements M2 and M3, thus decreasing the output voltage Vout. In another example, when the output voltage Vout decreases as shown in FIG. 5, the voltage of the error signal EAo increases. Accordingly, the duty cycle of the pulse signal Spw increases. This further increases the ON time of the first switching element M1, and decreases the ON time of the second and third switching elements M2 and M3, thus increasing the output voltage Vout. In this manner, the level of the output voltage Vout is controlled.

Figure 7:
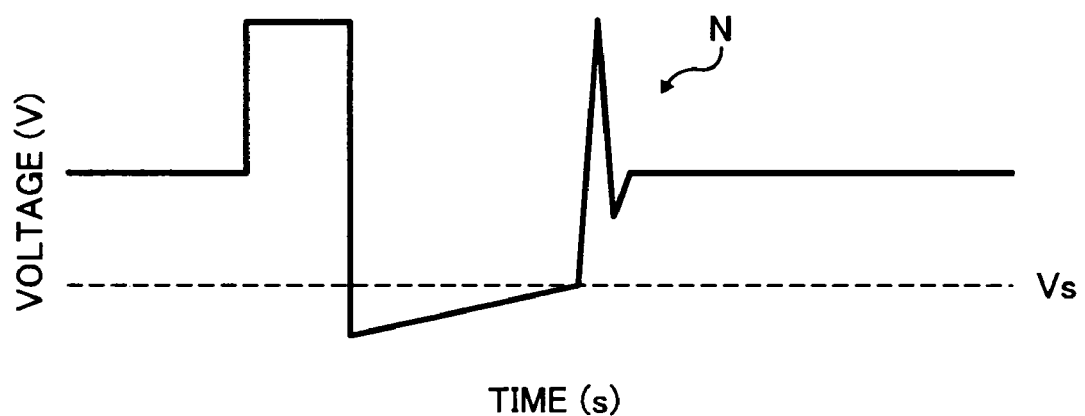
FIG. 7 is a waveform chart illustrating a damping noise generated in a switching regulator.

Referring to FIG. 6, when the comparator 11 of the reverse current suppressing circuit 6 determines that the reverse current is generated or about to be generated, i.e., when the voltage detected at the node Lx1 is equal to or greater than the ground voltage Vs, the comparator 11 outputs the low level signal to the AND circuit AN1. As a result, the AND circuit AN1 outputs the low level signal to the third buffer BF3, and the third switching element M3 is disabled, causing the on-resistance of the switching circuit 7 to increase. The second switching element M2 controls the level of the output voltage Vout together with the first switching element M1. In one example, when the output voltage Vout increases as shown in FIG. 6, the voltage of the error signal EAo decreases. Accordingly, the duty cycle of the pulse signal Spw decreases. This further decreases the ON time of the first switching element M1, and increases the ON time of the second switching element M2, thus decreasing the output voltage Vout. Further, the increased resistance of the switching circuit 7 suppresses the reverse current flowing from the output terminal OUT toward the switching circuit 7 or the voltage spike across the switching circuit 7, thus suppressing the damping noise N as shown in FIG. 7. In another example, when the output voltage Vout decreases as shown in FIG. 6, the voltage of the error signal EAo increases. Accordingly, the duty cycle of the pulse signal Spw increases. This further increases the ON time of the first switching element M1, and decreases the ON time of the second switching element M2, thus increasing the output voltage Vout. Further, the increased resistance of the switching circuit 7 suppresses the reverse current flowing from the output terminal OUT toward the switching circuit 7 or the voltage spike across the switching circuit 7, thus suppressing the damping noise N as shown in FIG. 7.

Figure 8:
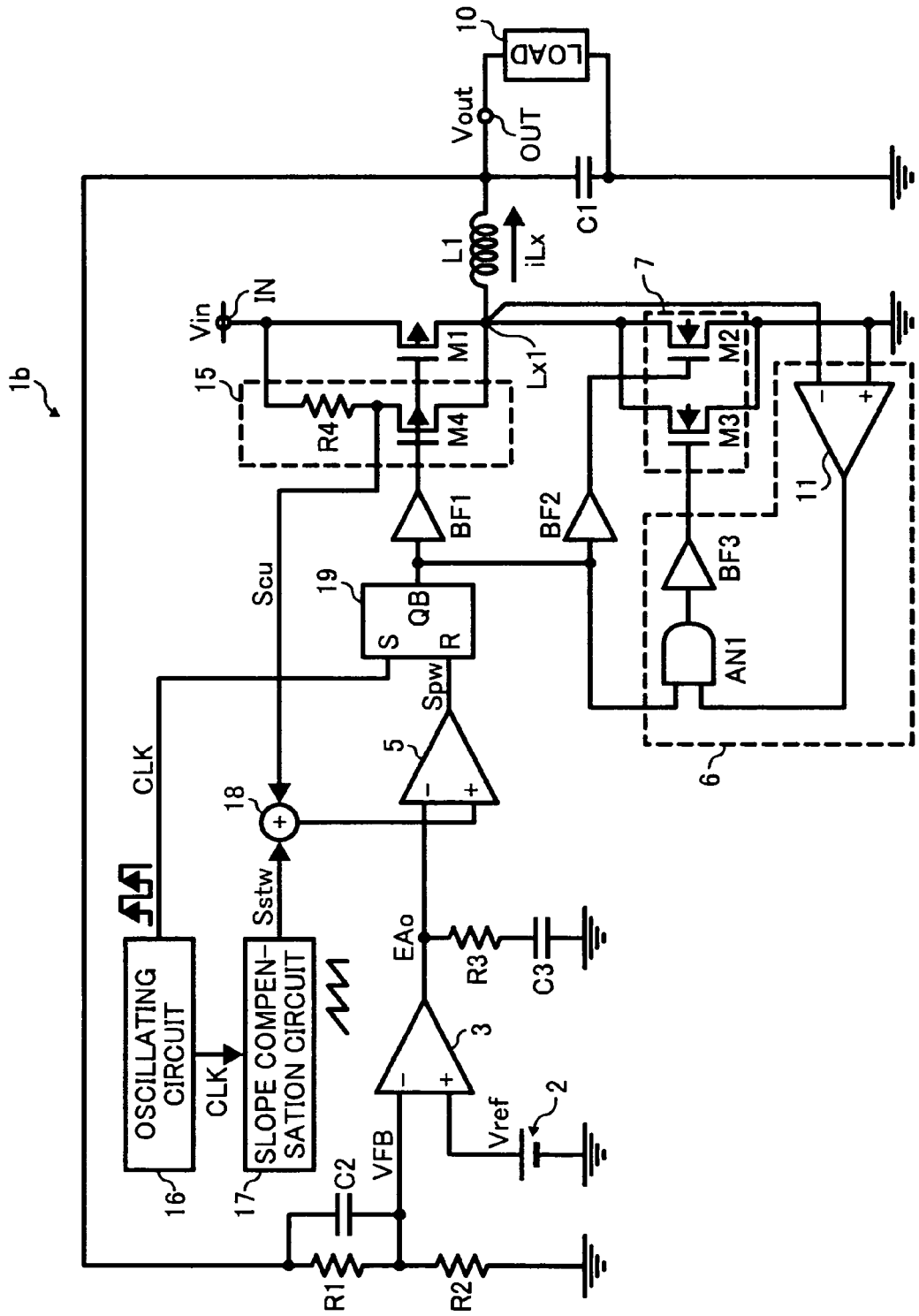
FIG. 8 is a schematic circuit diagram illustrating the structure of a switching regulator according to an exemplary embodiment of the present disclosure.

Referring now to FIG. 8, the circuit structure and operation of a switching regulator 1b are explained. The switching regulator 1b is a step-down current-mode controlled switching regulator, which converts the input voltage Vin to the output voltage Vout that is smaller than the input voltage Vin using the feedback from the detected current. The switching regulator 1b of FIG. 8 is substantially similar in circuit structure to the switching regulator 1a of FIG. 4. The differences include the deletion of the oscillating circuit 4, and the addition of a current detection circuit 15 having a fourth resistor R4 and a fourth switching element M4, an oscillating circuit 16, a slope compensation circuit 17, an ADD circuit 18, and a flip-flop circuit 19. Any number of components in the switching regulator 1b may be integrated as one integrated circuit. In one example, the controller circuit and the reverse current suppressing circuit 6 may be formed as one integrated circuit for controlling the switching regulator 1b. In another example, the controller circuit, the reverse current suppressing circuit 6, the first switching element M1, and the switching circuit 7 may be formed as one integrated circuit for controlling the switching regulator 1b. In this example, the controller circuit includes the reference voltage generator 2, the first resistor R1, the second resistor R2, the third resistor R3, the error amplifier circuit 3, the PWM comparator 5, the first buffer BF1, the second buffer BF2, the second capacitor C2, the third capacitor C3, the oscillating circuit 16, the slope compensation circuit 17, the ADD circuit 18, the flip-flop circuit 19, and the current detection circuit 15.

The fourth resistor R4 and the fourth switching element M4, which are connected in series, are connected in parallel with the first switching element M1. The gate of the fourth switching element M4 is connected to the gate of the first switching element M1. In this example, the fourth switching element M4 is implemented by a PMOS transistor. The oscillating circuit 16 generates a clock signal CLK, and outputs the clock signal CLK respectively to the slope compensation circuit 17 and the set terminal S of the flip-flop circuit 19. The slope compensation circuit 17 generates a saw wave signal Sstw, and outputs it to the ADD circuit 18.

In this example, the level of the output voltage Vout is controlled based on the current detected in the switching regulator 1b. The current at the node between the fourth resistor R4 and the fourth switching element M4 is detected, which is proportional to the output current io at the output terminal OUT. The detected current is then converted to a detected voltage, and output from the node between the fourth resistor R4 and the fourth switching element M4 to the ADD circuit 18 as a detected signal Scu.

The ADD circuit 18 adds the saw wave signal Sstw and the detected signal Scu to generate a difference signal, and outputs the difference signal to the non-inverse terminal of the PWM comparator 5. The PWM comparator 5 generates a pulse signal Spw based on the error signal EAo and the difference signal, and outputs the pulse signal Spw to the reset input terminal R of the flip-flop circuit 19. The output terminal QB of the flip-flop circuit 19 is connected respectively to the fourth switching element M4 and the first switching element M1 via the first buffer BF1, the second switching element M2 via the second buffer BF2, and the third switching element M3 via the third buffer BF3.

In operation, the controller circuit controls the level of the output voltage Vout based on the detected current, by controlling the ON time of the first switching element M1 or the switching circuit 7. The set terminal S of the flip-flop circuit 19 is activated by the clock signal CLK to cause the output terminal QB to output a low level signal. The reset terminal R of the flip-flop circuit 19 is activated by the pulse signal Spw to cause the output terminal QB to output a high level signal. Based on the level of the output signal output from the flip-flop circuit 19, the ON time of the first switching element M1 or the switching circuit 7 is controlled. Further, the third switching element M3 may be disabled by the reverse current suppressing circuit 6 to suppress the flow of the reverse current generated in the switching regulator 1b in a substantially similar manner as described above referring to any one of FIGS. 4 to 7.

Figure 9:
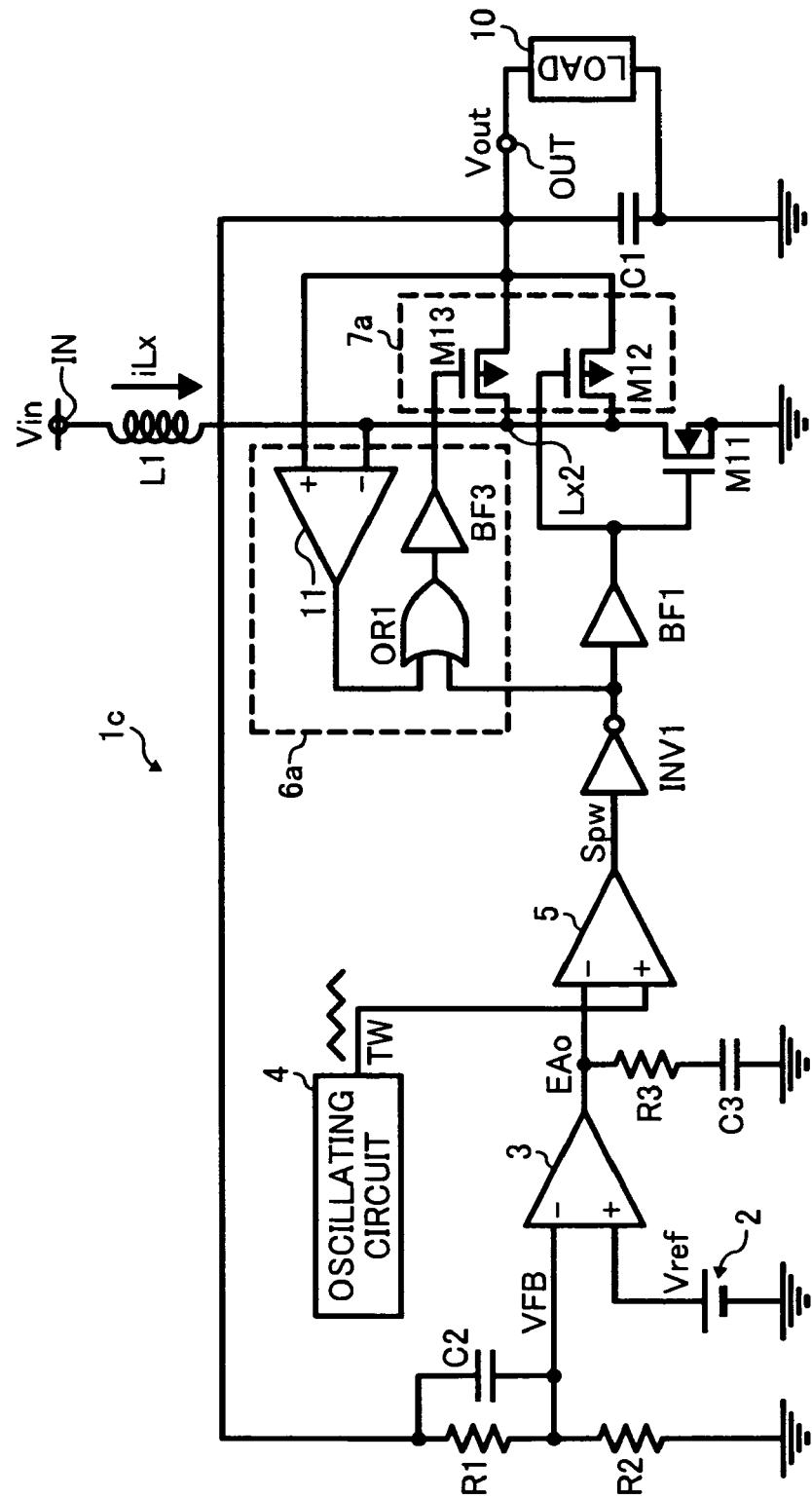
FIG. 9 is a schematic circuit diagram illustrating the structure of a switching regulator according to an exemplary embodiment of the present disclosure.

Referring now to FIG. 9, the circuit structure and operation of a switching regulator 1c are explained. The switching regulator 1c is a step-up voltage-mode controlled switching regulator, which converts the input voltage Vin to the output voltage Vout that is greater than the input voltage Vin using the feedback from the detected voltage.

The switching regulator 1c includes the input terminal IN, the output terminal OUT, the first capacitor C1, the inductor L1, a first switching element M11, a reverse current suppressing circuit 6a, a switching circuit 7a including a second switching element M12 and a third switching element M13, and a controller circuit including the reference voltage generator 2, the first resistor R1, the second resistor R2, the third resistor R3, the error amplifier circuit 3, the oscillating circuit 4, the PWM comparator 5, the first buffer BF1, the second capacitor C2, the third capacitor C3, and an inverter INV1.

In this example, the first switching element M11 is implemented by an NMOS transistor. The second switching element M12 and the third switching element M13 are each implemented by PMOS transistors. Further, in this example, the on-resistance of the second switching element M12 is set higher than the on-resistance of the third switching element M13. The reverse current suppressing circuit 6a is substantially similar in circuit structure to the reverse current suppressing circuit 6 of FIG. 4 or 8. The differences include the replacement of the AND circuit AN1 with an OR circuit OR1. Any number of components in the switching regulator 1c may be integrated as one integrated circuit. In one example, the controller circuit and the reverse current suppressing circuit 6a may be formed as one integrated circuit for controlling the switching regulator 1c. In another example, the controller circuit, the reverse current suppressing circuit 6a, the first switching element M11, and the switching circuit 7a may be formed as one integrated circuit for controlling the switching regulator 1c.

Still referring to FIG. 9, the inductor L1 and the first switching element M11 are connected in series between the input terminal IN and the ground. The second switching element M12 and the third switching element M13, which are connected in parallel, are connected with the first switching element M11 at a node Lx2 between the inductor L1 and the output terminal OUT. The comparator 11 is connected to the node Lx2 at the inverse input terminal, and to the output terminal OUT at the non-inverse input terminal. One input terminal of the OR circuit OR1 is connected to the output terminal of the comparator 1. The OR circuit OR1 is further connected to the output terminal of the inverter INV1 at the other input terminal, and to the gate of the third switching element M13 via the third buffer BF3 at the output terminal. The output terminal of the PWM comparator 5 is connected to the first buffer BF1 and the other input terminal of the OR circuit OR1, via the inverter INV1.

In operation, the controller circuit controls the level of the output voltage Vout based on the detected output voltage Vout, by controlling the ON time of the first switching element M11 or the switching circuit 7a. Further, in this example, the reverse current suppressing circuit 6a determines that the current is reversed or is about to be reversed, when the voltage detected at the node Lx2 is equal to or less than the output voltage Vout. At this time, the comparator 11 outputs a high level signal to the OR circuit OR1. As a result, the OR circuit OR1 outputs the high level signal to the third buffer BF3, and the third switching element M13 is disabled. Since the on-resistance value of the second switching element M12 is greater than the on-resistance of the third switching element M13, the on-resistance of the switching circuit 7a increases. Accordingly, the reversed current flowing from the output terminal OUT toward the switching circuit 7a is suppressed.

In one example, when the comparator 11 of the reverse current suppressing circuit 6a determines that no reverse current is generated, i.e., when the voltage detected at the node Lx2 is greater than the output voltage Vout, the comparator 11 outputs a low level signal to the OR circuit OR1. As a result, the OR circuit OR1 outputs the inverse of the pulse signal Spw to the third buffer BF3, and the third switching element M13 is not disabled. The third switching element M13 continues to control the level of the output voltage Vout together with the first and second switching elements M11 and M12. When the output voltage Vout increases, the voltage of the error signal EAo decreases, and the duty cycle of the pulse signal Spw decreases. This further increases the ON time of the first switching element M11, and decreases the ON time of the second and third switching elements M12 and M13, thus decreasing the output voltage Vout. When the output voltage Vout decreases, the voltage of the error signal EAo increases, and the duty cycle of the pulse signal Spw increases. This further decreases the ON time of the first switching element M11, and increases the ON time of the second and third switching elements M12 and M13, thus increasing the output voltage Vout. In this manner, the level of the output voltage Vout is controlled.

Figure 10:
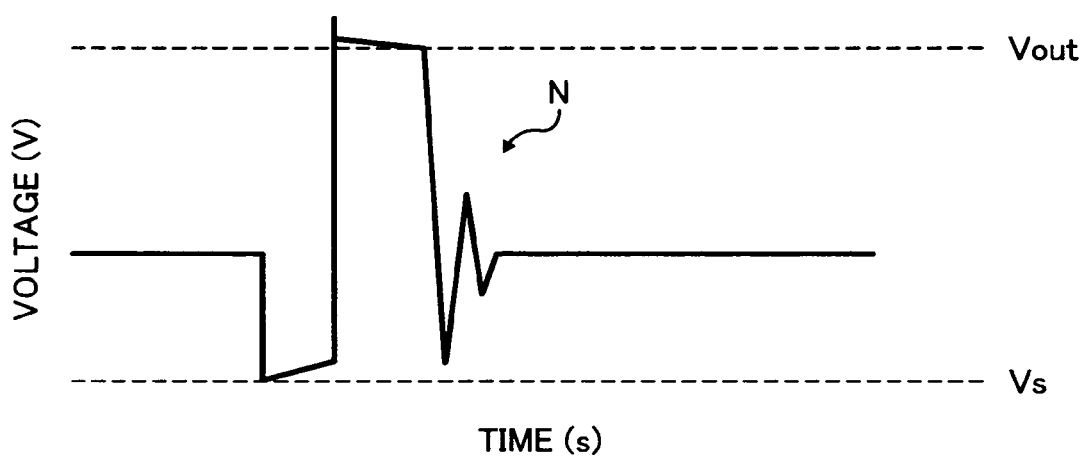
FIG. 10 is a waveform chart illustrating a damping noise generated in a switching regulator.

In another example, when the comparator 11 of the reverse current suppressing circuit 6a determines that the reverse current is generated or about to be generated, i.e., when the voltage detected at the node Lx2 is equal to or less than the output voltage Vout, the comparator 11 outputs the high level signal to the OR circuit OR1. As a result, the OR circuit OR1 outputs the high level signal to the third buffer BF3, and the third switching element M13 is disabled, causing the on-resistance of the switching element 7a to increase. The first and second switching elements M11 and M12 control the level of the output voltage Vout. When the output voltage Vout increases, the voltage of the error signal EAo decreases, and the duty cycle of the pulse signal Spw decreases. This further increases the ON time of the first switching element M11, and decreases the ON time of the second switching element M12, thus increasing the output voltage Vout. Further, the increased on-resistance of the switching circuit 7a may suppress the reverse current flowing from the output terminal OUT toward the switching circuit 7a, or the voltage spike across the switching circuit 7a, thus suppressing the damping noise N as shown in FIG. 10. When the output voltage Vout decreases, the voltage of the error signal EAo increases, and the duty cycle of the pulse signal Spw increases. This further decreases the ON time of the first switching element M11, and increases the ON time of the second switching element M12, thus decreasing the output voltage Vout. Further, the increased on-resistance of the switching circuit 7a may suppress the reverse current flowing from the output terminal OUT toward the switching circuit 7a, or the voltage spike across the switching circuit 7a, thus suppressing the damping noise N as shown in FIG. 10.

Figure 11:
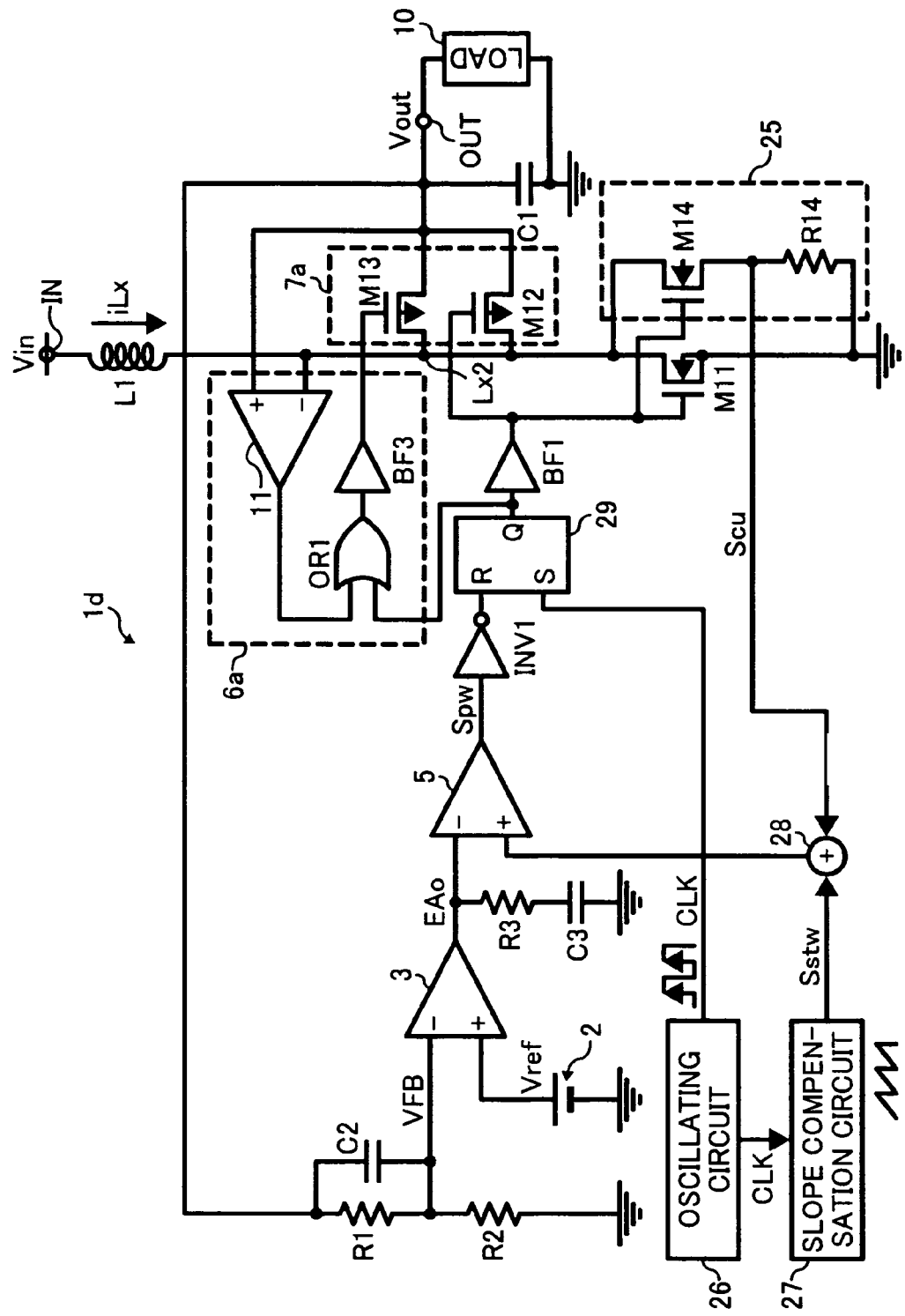
FIG. 11 is a schematic circuit diagram illustrating the structure of a switching regulator according to an exemplary embodiment of the present disclosure.

Referring now to FIG. 11, the circuit structure and operation of a switching regulator 1d are explained. The switching regulator 1d is a step-up current-mode controlled switching regulator, which converts the input voltage Vin to the output voltage Vout that is greater than the input voltage Vin using the feedback from the detected current. The switching regulator 1d of FIG. 11 is substantially similar in circuit structure to the switching regulator 1c of FIG. 9. The differences include the deletion of the oscillating circuit 4, and the addition of a current detection circuit 25 having a fourth resistor R14 and a fourth switching element M14, an oscillating circuit 26, a slope-compensation circuit 27, an ADD circuit 28, and a fill-flop circuit 29. Any number of components in the switching regulator 1d may be integrated as one integrated circuit. In one example, the controller circuit and the reverse current suppressing circuit 6a may be formed as one integrated circuit for controlling the switching regulator 1d. In another example, the controller circuit, the reverse current suppressing circuit 6a, the first switching element M11, and the switching circuit 7a may be formed as one integrated circuit for controlling the switching regulator 1d. In this example, the controller circuit includes the reference voltage generator 2, the first resistor R1, the second resistor R2, the third resistor R3, the error amplifier circuit 3, the phase-width modulation (PWM) comparator 5, the first buffer BF1, the second capacitor C2, the third capacitor C3, the oscillating circuit 26, the slope compensation circuit 27, the Add circuit 28, the flip-flop circuit 29, and the current detection circuit 25.

The fourth resistor R14 and the fourth switching element M14, which are connected in series, are connected in parallel with the first switching element M11. The gate of the fourth switching element M14 is connected to the gate of the first switching element M11. In this example, the fourth switching element M14 is implemented by an NMOS transistor. The oscillating circuit 26 generates a clock signal CLK, and outputs the clock signal CLK respectively to the slope compensation circuit 27 and the set terminal S of the flip-flop circuit 29. The slope compensation circuit 27 generates a saw wave signal Sstw, and outputs it to the ADD circuit 28.

The current at the node between the fourth resistor R14 and the fourth switching element M14, which is proportional to the output current io, is detected. The detected current is then converted to a detected voltage, and output from the node between the fourth resistor R14 and the fourth switching element M14 to the ADD circuit 28 as a detected signal Scu.

The ADD circuit 28 adds the saw wave signal Sstw and the detected signal Scu to generate a difference signal, and outputs the difference signal to the non-inverse input terminal of the PWM comparator 5. The PWM comparator 5 generates a pulse signal Spw based on the error signal EAo and the difference signal, and outputs the pulse signal Spw to the reset input terminal R of the flip-flop circuit 29 via the inverter INV1. The output terminal QB of the flip-flop circuit 29 is connected respectively to the gates of the fourth switching element M14, the first switching element M11, and the second switching element M12, via the first buffer BF1. The output terminal QB of the flip-flop circuit 29 is further connected to one input terminal of the OR circuit OR1.

In operation, the controller circuit controls the level of the output voltage Vout based on the detected current, by controlling the ON time of the first switching element M11 or the switching circuit 7a. The set terminal S of the flip-flop circuit 29 is activated the clock signal CLK to cause the output terminal QB to output a high level signal. The reset terminal R of the flip-flop circuit 29 is activated by the pulse signal Spw to cause the output terminal QB to output a low level signal. Based on the level of the output signal output from the flip-flop circuit 29, the ON time of the first switching element M11 or the switching circuit 7a is controlled. Further, the third switching element M13 may be disabled by the reverse current suppressing circuit 6a to suppress the reverse current generated in the switching regulator in a substantially similar manner as described above referring to FIG. 9.

As described above referring to any one of FIGS. 4 to 11, the reverse current generated in a switching regulator may be suppressed by disabling at least one of synchronous switching elements provided in the switching regulator. Alternatively, the reverse current may be suppressed by controlling the gate voltage of at least one of synchronous switching elements provided in the switching regulator, for example, as described below referring to any one of FIGS. 12 to 15.

Figure 12:
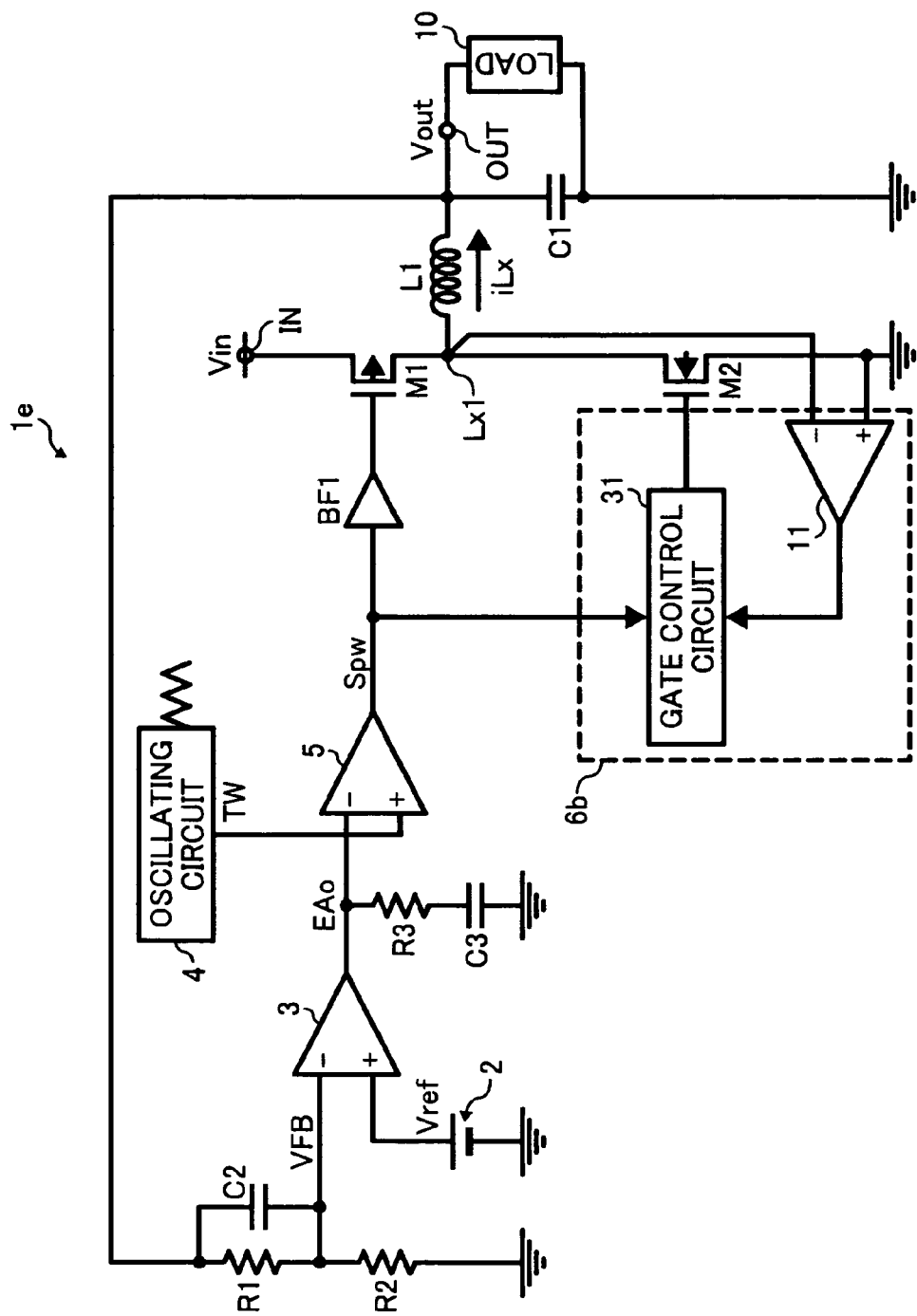
FIG. 12 is a schematic circuit diagram illustrating the structure of a switching regulator according to an exemplary embodiment of the present disclosure.

Referring now to FIG. 12, the circuit structure and operation of a switching regulator 1e are explained. The switching regulator 1e is a step-down voltage-mode controlled switching regulator, which is substantially similar in circuit structure to the switching regulator 1a of FIG. 1. The differences include the deletion of the second buffer BF2 and third switching element M3, and the replacement of the reverse current suppressing circuit 6 with a reverse current suppressing circuit 6b. The reverse current suppressing circuit 6b includes a gate control circuit 31 and the comparator 11. Any number of components in the switching regulator 1e may be integrated as one integrated circuit. In one example, the controller circuit and the reverse current suppressing circuit 6b may be formed as one integrated circuit for controlling the switching regulator 1e. In another example, the controller circuit, the reverse current suppressing circuit 6b, the first switching element M1, and the second switching element M2 may be formed as one integrated circuit for controlling the switching regulator 1e. In this example, the controller circuit includes the reference voltage generator 2, the first resistor R1, the second resistor R2, the third resistor R3, the second capacitor C2, the third capacitor C3, the error amplifier circuit 3, the oscillating circuit 4, the PWM comparator 5, and the first buffer BF1.

In operation, the controller circuit controls the level of the output voltage Vout based on the detected output voltage Vout, by controlling the ON time of the first switching element M1 or the second switching element M2, in a substantially similar manner as described above referring to FIG. 4. In this example, the reverse current suppressing circuit 6b suppresses the reverse current by controlling the level of the gate voltage input to the second switching element M2.

In one example, when the comparator 11 determines that the current is reversed or is about to be reversed, i.e., when the voltage detected at the node Lx1 is equal to or greater than the ground voltage Vs, the comparator 11 outputs a low level signal to the gate control circuit 31. Upon receiving the low level signal, the gate control circuit 31 reduces the level of the gate voltage input to the second switching element M2 to increase the on-resistance value of the second switching element M2. Accordingly, the reversed current flowing from the output terminal OUT toward the second switching element M2 is suppressed. Further, the voltage spike across the second switching element M2 is suppressed. In another example, when the reverse current suppressing circuit 6b determines that the current is not reversed, i.e., when the voltage detected at the node Lx1 is less than the ground voltage Vs, the comparator 11 outputs a high level signal to the gate control circuit 31. Upon receiving the high level signal, the gate control circuit 31 increases the level of the gate voltage input to the second switching element M2 to decrease the on-resistance value of the second switching element M2.

Figure 13:
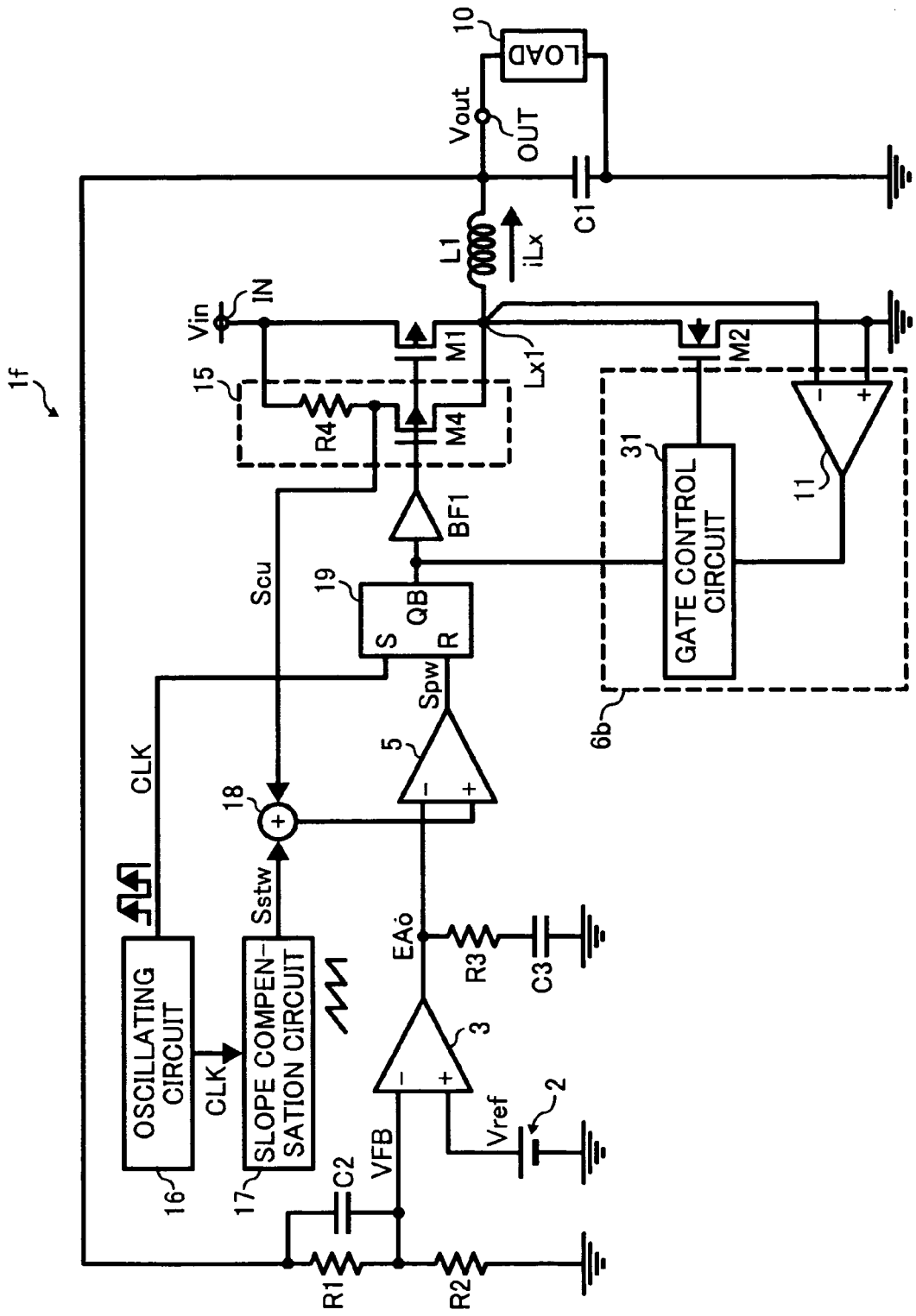
FIG. 13 is a schematic circuit diagram illustrating the structure of a switching regulator according to an exemplary embodiment of the present disclosure.

Referring now to FIG. 13, the circuit structure and operation of a switching regulator 1f are explained. The switching regulator 1f is a step-down current-mode controlled switching regulator, which is substantially similar in circuit structure to the switching regulator 1b of FIG. 8. The differences include the deletion of the second buffer BF2 and third switching element M3, and the replacement of the reverse current suppressing circuit 6 with a reverse current suppressing circuit 6b. The reverse current suppressing circuit 6b includes the gate control circuit 31 and the comparator 11. Any number of components in the switching regulator 1f may be integrated as one integrated circuit. In one example, the controller circuit and the reverse current suppressing circuit 6b may be formed as one integrated circuit for controlling the switching regulator 1f. In another example, the controller circuit, the reverse current suppressing circuit 6b, the first switching element M1, and the second switching element M2 may be formed as one integrated circuit for controlling the switching regulator 1f. In this example, the controller circuit includes the reference voltage generator 2, the first resistor R1, the second resistor R2, the third resistor R3, the error amplifier circuit 3, the the PWM comparator 5, the first buffer BF1, the second capacitor C2, the third capacitor C3, the oscillating circuit 16, the slope compensation circuit 17, the ADD circuit 18, the flip-flop circuit 19, and the current detection circuit 15.

In operation, the controller circuit controls the level of the output voltage Vout based on the detected current, by controlling the ON time of the first switching element M1 or the second switching element M2. The set terminal S of the flip-flop circuit 19 is activated by the clock signal CLK to cause the output terminal QB to output a low level signal. The reset terminal R of the flip-flop circuit 19 is activated by the pulse signal Spw to cause the output terminal QB to output a high level signal. The high or low level signal output from the output terminal QB is input to the gates of the switching elements M1 and M4, and the gate control circuit 31. Based on the level of the output signal from the flip-flop circuit 19, the ON time of the first switching element M1 or the second switching element M2 is controlled. Further, the gate control circuit 31 controls the level of the gate voltage input to the second switching element M2 as described above referring to FIG. 12.

Figure 14:
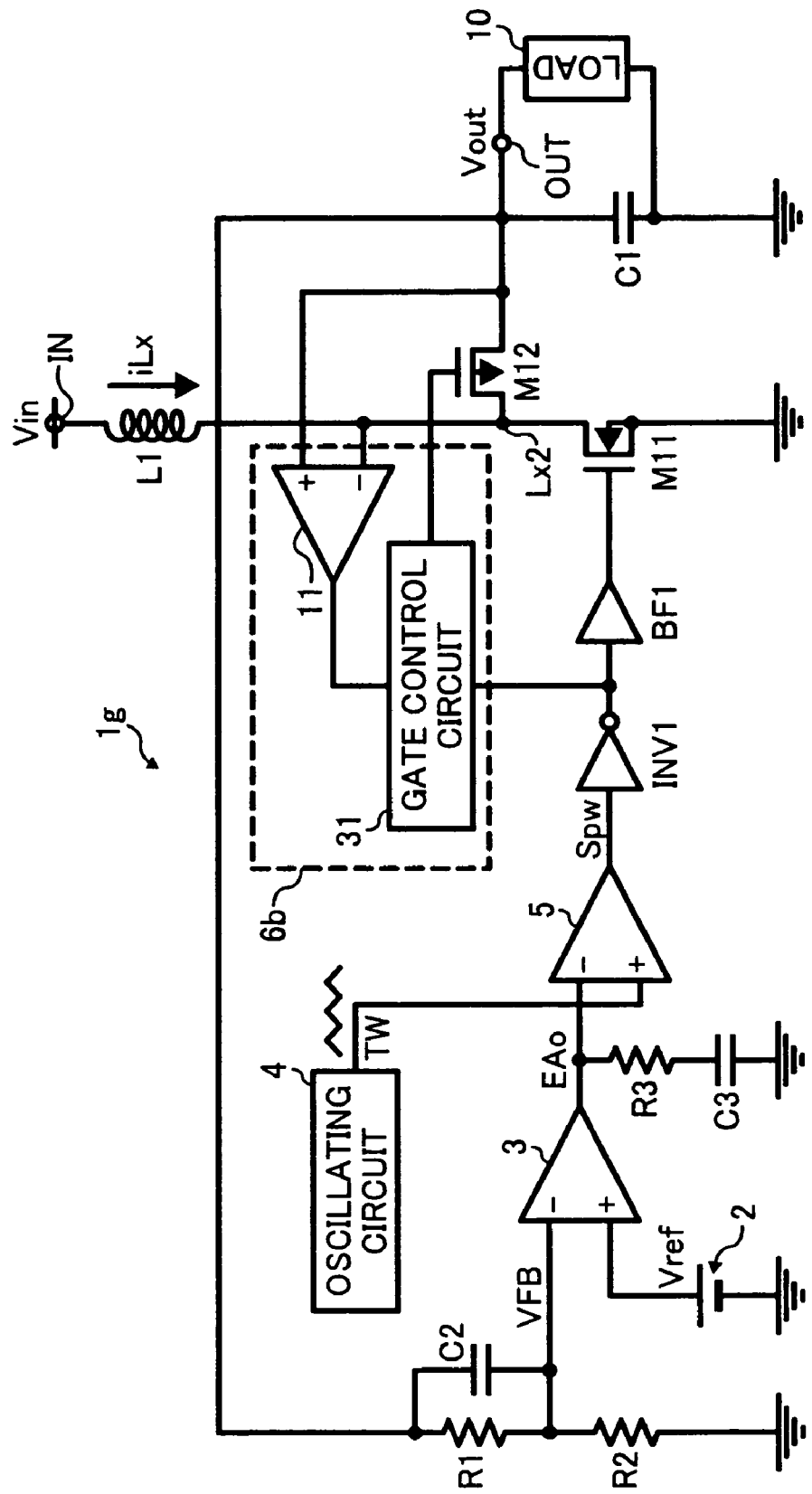
FIG. 14 is a schematic circuit diagram illustrating the structure of a switching regulator according to an exemplary embodiment of the present disclosure.

Referring now to FIG. 14, the circuit structure and operation of a switching regulator 1g are explained. The switching regulator 1g is a step-up voltage-mode controlled switching regulator, which is substantially similar in circuit structure to the switching regulator 1c of FIG. 9. The difference include the deletion of the third switching element M13, and the replacement of the reverse current suppressing circuit 6a with the reverse current suppressing circuit 6b. Any number of components in the switching regulator 1g may be integrated as one integrated circuit. In one example, the controller circuit and the reverse current suppressing circuit 6b may be formed as one integrated circuit for controlling the switching regulator 1g. In another example, the controller circuit, the reverse current suppressing circuit 6b, the first switching element M11, and the second switching element M12 may be formed as one integrated circuit for controlling the switching regulator 1g. In this example, the controller circuit includes the reference voltage generator 2, the first resistor R1, the second resistor R2, the third resistor R3, the error amplifier circuit 3, the oscillating circuit 4, the PWM comparator 5, the second capacitor C2, the third capacitor C3, the first buffer BF1, and the inverter INV1.

In operation, the controller circuit controls the level of the output voltage Vout based on the detected output voltage Vout, by controlling the ON time of the first switching element M11 or the second switching element M12. Further, in this example, the reverse current suppressing circuit 6b controls the level of the gate voltage input to the second switching element M12 based on whether the reverse current is generated in the switching regulator 1g.

In one example, when the comparator 11 determines that the reverse current is not generated, i.e., when the voltage detected at the node Lx2 is greater than the ground voltage Vs, the comparator 11 outputs a low level signal to the gate control circuit 31 via the inverter INV1. Upon receiving the inverse of the low level signal, the gate control circuit 31 increases the level of the gate voltage input to the second switching element M12 to decrease the on-resistance value of the second switching element M12.

In another example, when the comparator 11 determines that the current is reversed or is about to be reversed, i.e., when the voltage detected at the node Lx2 is equal to or less than the ground voltage Vs, the comparator 11 outputs a high level signal to the gate control circuit 31 via the inverter INV1. Upon receiving the inverse of the high level signal, the gate control circuit 31 decreases the gate voltage input to the second switching element M12 to increase the on-resistance of the second switching element M12. Accordingly, the reverse current flowing toward the second switching element M12 is suppressed.

Figure 15:
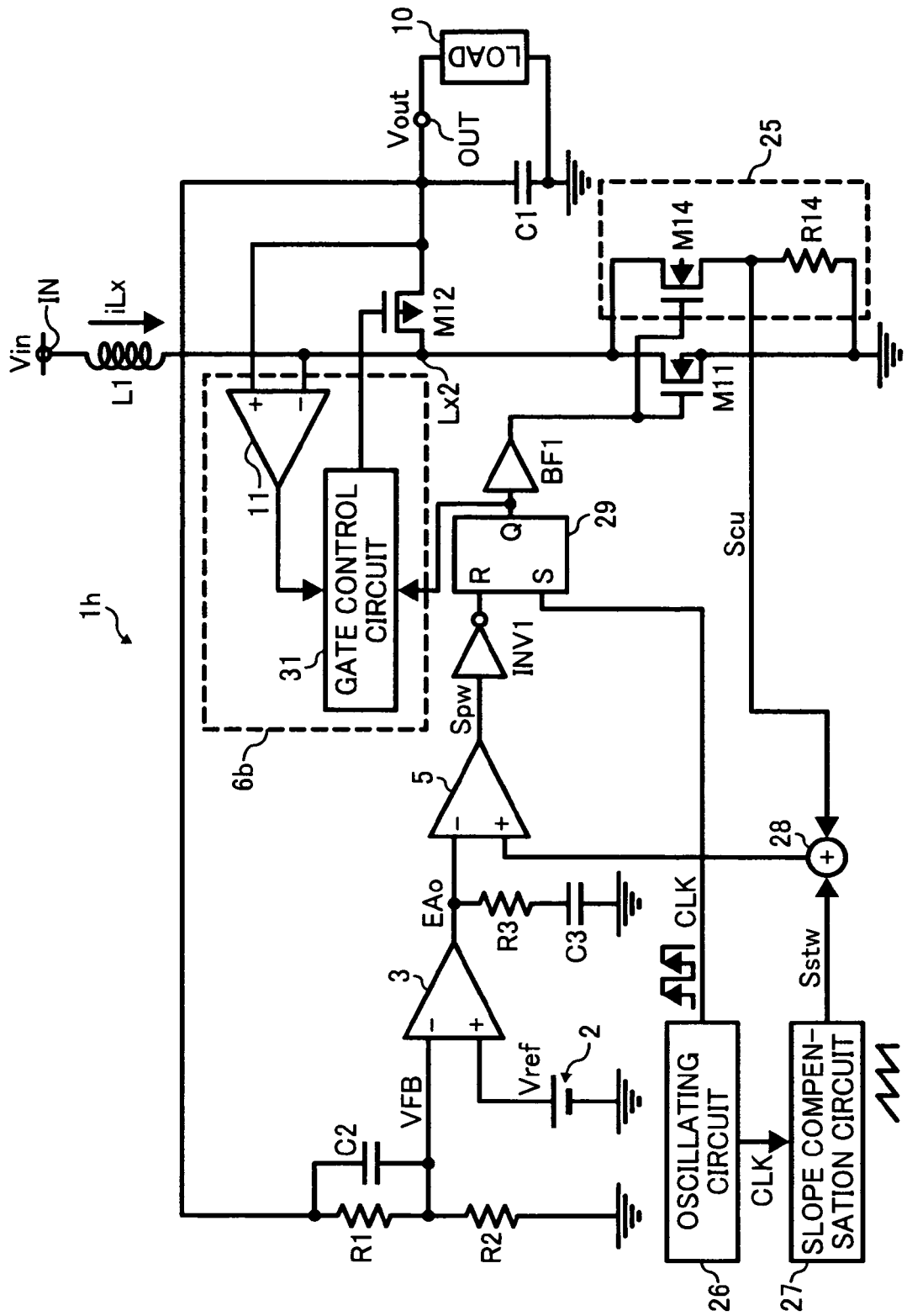
FIG. 15 is a schematic circuit diagram illustrating the structure of a switching regulator according to an exemplary embodiment of the present disclosure.

Referring now to FIG. 15, the circuit structure and operation of a switching regulator 1h are explained. The switching regulator 1h is a step-up current-mode controlled switching regulator, which is substantially similar in circuit structure to the switching regulator 1d of FIG. 11. The differences include the deletion of the third buffer BF3 and the third switching element M13, and the replacement of the reverse current suppressing circuit 6a with the reverse current suppressing circuit 6b. Any number of components in the switching regulator 1h may be integrated as one integrated circuit. In one example, the controller circuit and the reverse current suppressing circuit 6b may be formed as one integrated circuit for controlling the switching regulator 1h. In another example, the controller circuit, the reverse current suppressing circuit 6b, the first switching element M11, and the second switching element M12 may be formed as one integrated circuit for controlling the switching regulator 1h. In this example, the controller circuit includes the reference voltage generator 2, the first resistor R1, the second resistor R2, the third resistor R3, the error amplifier circuit 3, the PWM comparator 5, the second capacitor C2, the third capacitor C3, the first buffer BF1, the inverter INV1, the current detection circuit 25, the oscillating circuit 26, the slope compensation circuit 27, the ADD circuit 28, and the flip-flop circuit 29.

In operation, the controller circuit controls the level of the output voltage Vout based on the detected current, by controlling the ON time of the first switching element M11 or the second switching element M12. Further, in this example, the reverse current suppressing circuit 6b controls the level of the gate voltage input to the second switching element M12 based on whether the reverse current is generated, in a substantially similar manner as described above referring to FIG. 14.

Numerous additional modifications and variations are possible in light of the above teachings. It is therefore to be understood that within the scope of the appended claims, the disclosure of this patent specification may be practiced in ways other than those specifically described herein.

Further, elements and/or features of different illustrative embodiments may be combined with each other and/or substituted for each other within the scope of this disclosure and appended claims. For example, any one of the reverse current suppressing circuits illustrated above may be combined with any other kind of controller circuits or incorporated into any other kind of switching regulators. In another example, one or more switching elements may be added to any one of the switching circuits described above.

This patent application is based on and claims priority to Japanese patent application No. 2005-337225 filed in the Japanese Patent Office on Nov. 22, 2005, the entire contents of which are hereby incorporated by reference.

The invention claimed is:

1. A switching regulator for converting an input voltage input through an input terminal to an output voltage output through an output terminal, the switching regulator comprising:
 a controller circuit configured to detect a current or a voltage in the switching regulator and output a first control signal for controlling a level of the output voltage based on the detected voltage or current;
 a first switching element connected to the controller circuit and configured to alternately turn on and off according to the first control signal to charge an inductor;

a switching circuit connected to the second switching element at a switch node, the switching circuit comprising a second switching element configured to turn on and off according to the first control signal in a reciprocal manner with the first switching element to discharge the inductor; and a reverse current suppressing circuit configured to generate a second control signal indicating whether a reverse current flowing from the output terminal toward the switching circuit is generated or is about to be generated, and to adjust on-resistance of the switching circuit based on the second control signal.

2. The switching regulator of claim 1, wherein the second control signal is generated based on a voltage detected at one or two sides of the switching circuit.

3. The switching regulator of claim 1, wherein the switching circuit further comprises:

a third switching element connected in parallel with the second switching element and configured to turn on or off according to the first control signal in the reciprocal manner with the first switching element, wherein the third switching element is disabled when the second control signal indicates that the reverse current is generated or is about to be generated.

4. The switching regulator of claim 3, wherein the on-resistance value of the second switching element is greater than the on-resistance value of the third switching element.

5. The switching regulator of claim 3, wherein the reverse current suppressing circuit comprises:

a comparator configured to compare a voltage detected at the switch node with a ground voltage, wherein the comparator outputs the second control signal indicating that the reverse current is generated or is about to be generated when the voltage detected at the switch node is equal to or greater than the ground voltage.

6. The switching regulator of claim 3, wherein the reverse current suppressing circuit comprises:

a comparator configured to compare a voltage detected at the switch node with the output voltage, wherein the comparator outputs the second control signal indicating that the reverse current is generated or is about to be generated when the voltage detected at the switch node is less than the output voltage.

7. The switching regulator of claim 1, wherein the reverse current suppressing circuit comprises:

a gate control circuit connected to a gate of the second switching element and configured to control the level of the voltage input to the gate of the second switching element according to the second control signal.

8. The switching regulator of claim 7, wherein the reverse current suppressing circuit further comprises:

a comparator configured to compare a voltage detected at the switch node with a ground voltage, wherein the comparator outputs the second control signal indicating that the reverse current is generated or is about to be generated when the voltage detected at the switch node is equal to or greater than the ground voltage.

9. The switching regulator of claim 7, wherein the reverse current suppressing circuit further comprises:

a comparator configured to compare a voltage detected at the switch node with a ground voltage, wherein the comparator outputs the second control signal indicating that the reverse current is generated or is about to be generated when the voltage detected at the switch node is less than the output voltage.

10. The switching regulator of claim 1, wherein the controller circuit and the reverse current suppressing circuit are formed as one integrated circuit.

11. The switching regulator of claim 1, wherein the controller circuit, the reverse current suppressing circuit, the first switching element, and the switching circuit are formed as one integrated circuit.

12. A circuit for controlling a switching regulator having a first switching element for charging an inductor and a switching circuit for discharging the inductor, the circuit comprising:

a controller circuit configured to output a first control signal for controlling the level of an output voltage of the switching regulator based on a feedback signal detected from the switching regulator; and a reverse current suppressing circuit configured to output a second control signal for indicating whether a reverse current flowing toward the switching circuit is generated or is about to be generated in the switching regulator and to control on-resistance of the switching circuit based on the second control signal.

13. The circuit of claim 12, wherein the second control signal is generated based on the comparison between a voltage detected at one side of the switching circuit and a voltage detected at the other side of the switching circuit.

14. The circuit of claim 12, wherein the switching circuit comprises:

a second switching element configured to turn on or off according to the first control signal in the reciprocal manner with the first switching element; and a third switching element connected in parallel with the second switching element and configured to turn on or off according to the first control signal in the reciprocal manner with the first switching element, wherein the third switching element is disabled when the second control signal indicates that the reverse current is generated or is about to be generated.

15. The circuit of claim 12, wherein the switching circuit comprises:

a second switching element configured to turn on or off according to the first control signal in the reciprocal manner with the first switching element, and wherein the reverse current suppressing circuit comprises:

a gate control circuit connected to a gate of the second switching element and configured to control the level of the voltage input to the gate of the second switching element according to the second control signal.

16. A circuit for controlling a switching regulator having a first switching element for charging an inductor and a switching circuit for discharging the inductor, the circuit comprising:

means for controlling the level of an output voltage of the switching regulator based on a feedback signal detected from the switching regulator;

means for determining whether a reverse current flowing toward the switching circuit is generated or is about to be generated in the switching regulator to generate a determination result; and means for controlling on-resistance of the switching circuit based on the determination result.

17. A method for controlling a switching regulator having a first switching element and a switching circuit, the method comprising:

generating a first control signal for controlling the level of an output voltage of the switching regulator based on a feedback signal from the switching regulator;

controlling the ON time of the first switching element or the switching circuit based on the first control signal;

determining whether a reverse current is generated or is about to be generated to output a second control signal; and controlling the on-resistance of the switching circuit based on the second control signal.

18. The method of claim 17, wherein the determining comprises:

comparing a voltage detected at one side of the switching circuit with a voltage detected at the other side of the switching circuit.

19. The method of claim 18, further comprising:

providing a plurality of switching elements in the switching circuit, wherein the controlling comprising:

disabling at least one of the plurality of switching elements.

20. The method of claim 18, further comprising:

providing at least one switching element in the switching circuit, wherein the controlling comprising:

changing the on-resistance value of the at least one switching element.

* * * * *